(12) United States Patent
Ma et al.

(10) Patent No.: US 11,158,319 B2
(45) Date of Patent: *Oct. 26, 2021

(54) INFORMATION PROCESSING SYSTEM, METHOD, DEVICE AND EQUIPMENT

(71) Applicant: ADVANCED NEW TECHNOLOGIES CO., LTD., Grand Cayman (KY)

(72) Inventors: Guolai Ma, Hangzhou (CN); Tian Chen, Hangzhou (CN); Liang Zhang, Hangzhou (CN); Zheng Yuan, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,051

(22) Filed: Jan. 25, 2021

(65) Prior Publication Data

US 2021/0142803 A1   May 13, 2021

Related U.S. Application Data (63) Continuation of application No. 16/823,264, filed on Mar. 18, 2020, now Pat. No. 10,930,284, which is a (Continued)

(30) Foreign Application Priority Data

Apr. 11, 2019   (CN) .......................... 201910288696.5

(51) Int. Cl.
*G10L 15/22* (2006.01)
*G06Q 30/02* (2012.01)
(Continued)

(52) U.S. Cl.
CPC .............. *G10L 15/22* (2013.01); *G10L 13/00* (2013.01); *G10L 15/26* (2013.01); *G10L 15/30* (2013.01);
(Continued)

(58) Field of Classification Search
None
See application file for complete search history.

(56) References Cited

U.S. PATENT DOCUMENTS 5,933,811 A * 8/1999 Angles ............... G06Q 30/0271
                                                          705/14.56
6,807,563 B1 * 10/2004 Christofferson .... H04L 12/1822
                                                          709/204
(Continued)

FOREIGN PATENT DOCUMENTS

CN      101277275 A      10/2008
CN      10377238 A       10/2013
(Continued)

OTHER PUBLICATIONS

International Search Report and Written Opinion of the International Searching Authority for PCT Application No. PCT/CN2020/071408 dated Oct. 15, 2020.
(Continued)

*Primary Examiner* — Seong-Ah A Shin (57) ABSTRACT

Methods, systems, and apparatus, including computer programs encoded on computer storage media, for processing voice data are provided. One of methods, implemented by an IoT device, includes: receiving voice data from a server, wherein the voice data is obtained through converting text data to voice data by the server; determining a content attribute associated with the voice data; determining a content attribute type of the content attribute associated with the voice data; determining a first play rule matching the content attribute type based on a matching relationship
(Continued)

between content attribute types and respective first play rules, wherein the first play rule including a play starting time and a play mode; and automatically playing the voice data according to the play starting time and the play mode.

14 Claims, 8 Drawing Sheets

Related U.S. Application Data continuation of application No. PCT/CN2020/071408, filed on Jan. 10, 2020.

(51) Int. Cl.
*G10L 15/30* (2013.01)
*H04L 29/08* (2006.01)
*G10L 13/00* (2006.01)
*G10L 15/26* (2006.01)

(52) U.S. Cl.
CPC ........ *H04L 67/12* (2013.01); *G10L 2015/223* (2013.01)

(56) References Cited

U.S. PATENT DOCUMENTS

| | | | |
|---|---|---|---|
| 8,842,978 B2 | 9/2014 | Hashimoto et al. | |
| 9,002,703 B1* | 4/2015 | Crosley | G10L 15/26 704/207 |
| 9,159,298 B2 | 10/2015 | Han et al. | |
| 9,231,898 B2* | 1/2016 | Orsini | G06Q 10/107 |
| 9,424,840 B1* | 8/2016 | Hart | G10L 15/22 |
| 9,672,812 B1* | 6/2017 | Watanabe | G10L 15/22 |
| 10,027,920 B2 | 7/2018 | Freiin Von Kapri et al. | |
| 10,091,583 B2 | 10/2018 | Holman | |
| 10,122,780 B2 | 11/2018 | Thang et al. | |
| 10,331,312 B2 | 6/2019 | Napolitano et al. | |
| 10,459,683 B2 | 10/2019 | Takatsuka | |
| 10,468,025 B2 | 11/2019 | Jin et al. | |
| 2005/0114141 A1* | 5/2005 | Grody | G10L 15/30 704/270 |
| 2005/0125232 A1* | 6/2005 | Gadd | G06Q 30/02 704/270.1 |
| 2005/0246174 A1* | 11/2005 | DeGolia | H04L 41/082 704/270 |
| 2006/0074755 A1* | 4/2006 | Juetten | G06Q 30/0232 705/14.32 |
| 2008/0240373 A1 | 10/2008 | Wilhelm | |
| 2009/0186635 A1* | 7/2009 | Vieri | G06Q 30/0251 455/466 |
| 2009/0204402 A1* | 8/2009 | Marwaha | G10L 13/08 704/260 |
| 2011/0092221 A1* | 4/2011 | Zubas | H04L 51/20 455/456.1 |
| 2011/0205149 A1* | 8/2011 | Tom | G06Q 30/0255 345/156 |
| 2012/0016674 A1* | 1/2012 | Basson | G10L 19/0018 704/258 |
| 2012/0310642 A1 | 12/2012 | Cao et al. | |
| 2013/0268260 A1* | 10/2013 | Lundberg | G06F 40/40 704/8 |
| 2013/0339457 A1* | 12/2013 | Freire | G06F 21/10 709/206 |
| 2014/0244710 A1 | 8/2014 | Sharma et al. | |
| 2014/0244834 A1 | 8/2014 | Guedalia et al. | |
| 2015/0057994 A1* | 2/2015 | Fang | G06F 40/242 704/4 |
| 2015/0208190 A1 | 7/2015 | Hooks et al. | |
| 2015/0220980 A1* | 8/2015 | Morrison | G06Q 30/0251 705/14.49 |
| 2015/0309984 A1* | 10/2015 | Bradford | G06F 40/263 704/8 |
| 2015/0347391 A1* | 12/2015 | Chen | H04L 51/046 704/9 |
| 2015/0379981 A1* | 12/2015 | Balasubramanian | G06Q 30/0255 704/260 |
| 2016/0092932 A1* | 3/2016 | Bharath | G06Q 30/0271 705/14.67 |
| 2016/0103830 A1 | 4/2016 | Cheong et al. | |
| 2016/0127751 A1 | 5/2016 | Choi | |
| 2016/0193732 A1 | 7/2016 | Breazeal | |
| 2017/0195728 A1 | 7/2017 | Mudd | |
| 2017/0345420 A1 | 11/2017 | Barnett | |
| 2018/0033045 A1* | 2/2018 | Flynn | H04W 4/025 |
| 2018/0260855 A1* | 9/2018 | Yu | G06Q 30/0269 |
| 2018/0351895 A1* | 12/2018 | Rathod | G06F 9/54 |
| 2018/0365695 A1 | 12/2018 | Liu et al. | |
| 2019/0080627 A1* | 3/2019 | Dey | G09B 19/00 |
| 2019/0102376 A1* | 4/2019 | Agrawal | G06F 40/30 |
| 2019/0198016 A1* | 6/2019 | McKenzie | G10L 15/19 |
| 2019/0333515 A1* | 10/2019 | Yoon | H04N 21/42203 |
| 2020/0105246 A1* | 4/2020 | Brake | H04L 51/12 |
| 2020/0160248 A1* | 5/2020 | Harmon | A61B 5/681 |

FOREIGN PATENT DOCUMENTS

| | | |
|---|---|---|
| CN | 103632670 A | 3/2014 |
| CN | 104618456 A | 5/2015 |
| CN | 105389160 A | 3/2016 |
| CN | 106535044 A | 3/2017 |
| CN | 103703431 B | 2/2018 |
| CN | 103493499 B | 4/2018 |
| CN | 105074684 B | 8/2018 |
| CN | 105009518 B | 9/2018 |
| CN | 107493542 B | 6/2019 |
| CN | 105144746 B | 7/2019 |
| CN | 104795067 B | 8/2019 |
| CN | 110191150 A | 8/2019 |
| CN | 105474207 B | 11/2019 |
| JP | 2017215971 A | 12/2017 |

OTHER PUBLICATIONS

First Search for Chinese Application No. 201910288696.5 dated May 8, 2020.
Supplementary Search for Chinese Application No. 201910288696.5 dated Jan. 10, 2021.

* cited by examiner

ND EQUIPMENT

CROSS-REFERENCE TO RELATED APPLICATIONS

The present application is a continuation application of U.S. patent application Ser. No. 16/823,264, filed on Mar. 18, 2020, and entitled "INFORMATION PROCESSING SYSTEM, METHOD, DEVICE AND EQUIPMENT", which is a continuation application of International Patent Application No. PCT/CN2020/071408, filed on Jan. 10, 2020, and entitled "INFORMATION PROCESSING SYSTEM, METHOD, DEVICE AND EQUIPMENT." The PCT application is based on and claims priority to the Chinese Patent Application No. 201910288696.5, filed on Apr. 11, 2019. All of the above-referenced applications are incorporated herein by reference in their entirety.

TECHNICAL FIELD

The application relates to the computer technology field, and, in particular, to an information processing system, method, apparatus, and device.

BACKGROUND ART

Currently, Internet of Things (IoT) scenarios are important offline scenarios. Various operations or tasks can be implemented through hardware devices in the IoT scenarios, which not only improves the quality of service, but also opens a channel for offline users to access the service.

Many functions or capabilities are unavailable for many hardware devices, especially for IoT devices in payment scenarios, due to the limitations of site, cost and other factors. In many situations, the IoT devices have a capability of reading voice data, but not a capability of displaying(i.e., have no screen component). Therefore, in the information recommendation or marketing process, it is urgent to maximize the potential of the IoT devices in voice. Accordingly, a more efficient technical solution for information recommendation is needed.

SUMMARY

The embodiments of the specification provide a method, apparatus, and non-transitory computer-readable storage medium for processing voice data to improve the efficiency of information recommendation.

A method of processing voice data is provided according to some embodiments of the specification. The method may be implemented by an IoT device. The method may comprise: receiving voice data from a server, wherein the voice data is obtained through converting text data to voice data by the server; determining a content attribute associated with the voice data; determining a content attribute type of the content attribute associated with the voice data; determining a first play rule matching the content attribute type based on a matching relationship between content attribute types and respective first play rules, wherein the first play rule including a play starting time and a play mode; and automatically playing the voice data according to the play starting time and the play mode.

In some embodiments, the content attribute type may comprise a financial content attribute type, an insurance content attribute type, or a game content attribute type.

In some embodiments, the method may further comprise: receiving image data and/or video data from the server; and playing the image data and/or video data according to a second play rule, the second play rule including another play starting time and another play mode.

In some embodiments, the play mode in the first play rule may include playing at a fixed or non-fixed play interval.

In some embodiments, the another play mode in the second play rule may include playing at a fixed or non-fixed play interval, a random play mode, or a carousel mode.

In some embodiments, the method may further comprise: receiving play rule configuration information from a configuration device; and determining the second play rule according to the play rule configuration information.

In some embodiments, the method may further comprise: pre-storing the matching relationship between the content attribute types and respective first play rules in a table.

An apparatus for processing voice data is provided according to some embodiments of the specification. The apparatus may be implemented on an IoT device, and the apparatus may comprise one or more processors and one or more non-transitory computer-readable memories coupled to the one or more processors and configured with instructions executable by the one or more processors to cause the apparatus to perform operations comprising: receiving voice data from a server, wherein the voice data is obtained through converting text data to voice data by the server; determining a content attribute associated with the voice data; determining a content attribute type of the content attribute associated with the voice data; determining a first play rule matching the content attribute type based on a matching relationship between content attribute types and respective first play rules, wherein the first play rule including a play starting time and a play mode; and automatically playing the voice data according to the play starting time and the play mode.

A non-transitory computer-readable storage medium is provided according to some embodiments of the specification. The non-transitory computer-readable storage medium may be configured with instructions executable by one or more processors to cause the one or more processors to perform operations comprising: receiving voice data from a server, wherein the voice data is obtained through converting text data to voice data by the server; determining a content attribute associated with the voice data; determining a content attribute type of the content attribute associated with the voice data; determining a first play rule matching the content attribute type based on a matching relationship between content attribute types and respective first play rules, wherein the first play rule including a play starting time and a play mode; and automatically playing the voice data according to the play starting time and the play mode.

The embodiments of the specification provide a system comprising a terminal device, a server, and one or more IoT devices, where the terminal device is configured to receive text data entered by a user and send the text data to the server, the server is configured to receive the text data from the user, convert the text data into voice data, and send the converted voice data to the one or more IoT devices, and the one or more IoT devices are configured to receive the voice data from the server and play the voice data according to a predetermined first play rule, the first play rule including a play starting time and a play mode. By converting text data into voice data and sending the voice data to corresponding IoT devices, the IoT devices can play the voice data according to a first play rule and users of the IoT devices can promptly learn about the corresponding information through the voice data. Therefore, the information recommendation efficiency can be improved, the users the IoT devices can be notified of marketing information without delay, the users' viscosity for the use of the corresponding machines and tools can be enhanced, and sales can be driven.

BRIEF DESCRIPTION OF THE DRAWINGS

To clearly describe the embodiments of the specification, drawings to be used in the description of the embodiments will be briefly introduced below. The drawings in the following description illustrate some embodiments in the specification. Those ordinary skilled in the art can obtain other drawings according to these drawings without creative effort.

DETAILED DESCRIPTION

The embodiments of the specification provide an information processing system, method, apparatus, and device.

A clear description of the embodiments will be provided below in conjunction with the drawings of the specification so that those of ordinary skill in the art can have a good understanding of the embodiments in the specification. The embodiments described hereinafter are merely some embodiments of the specification and are not all embodiments. All other embodiments obtained by those of ordinary in the art based on the embodiments of the specification without creative effort fall in the scope of protection of the specification.

Figure 1:
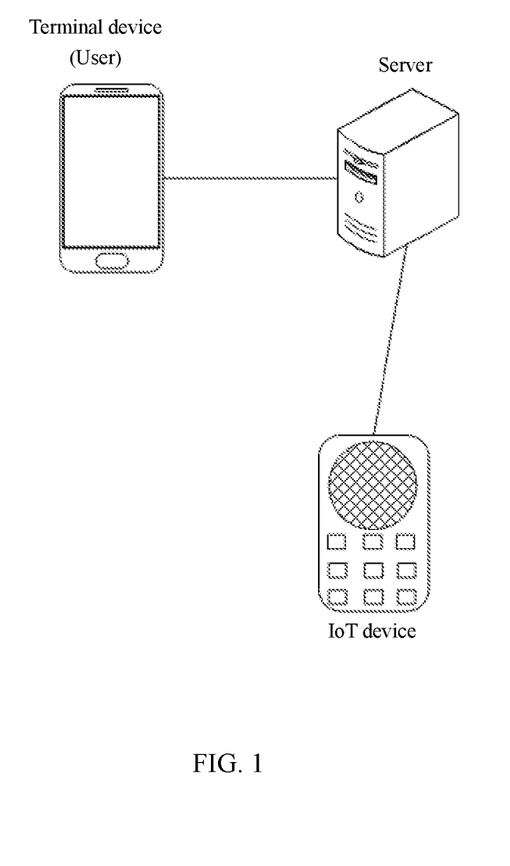
FIG. 1 illustrates an information processing system according to some embodiments of the specification.

As shown in FIG. 1, the embodiments of the specification provide an information processing system, which may comprise a terminal device, a server, and an IoT device, where the terminal device may be a mobile terminal device such as a cell phone and a tablet computer or a device such as a personal computer (PC), the server may include a single server or a server cluster including a plurality of servers, the IoT device may be a device in an IoT scenario and may be a smart air cleaner, a smart mattress, etc. This system may be configured to dispatch marketing information to the corresponding IoT device and perform other processing.

The server may be a back-end server for data processing and sending, ora server providing services related to the IoT device, or a back-end server for resource transfer (e.g. a back-end server for payment, account transfer and other financial services), etc. In some embodiments, the server may be a back-end server for resource transfer and may also be configured to convert text data into voice data. The text data may include texts (e.g. Chinese characters or English letters), symbols and numbers.

Figure 2:
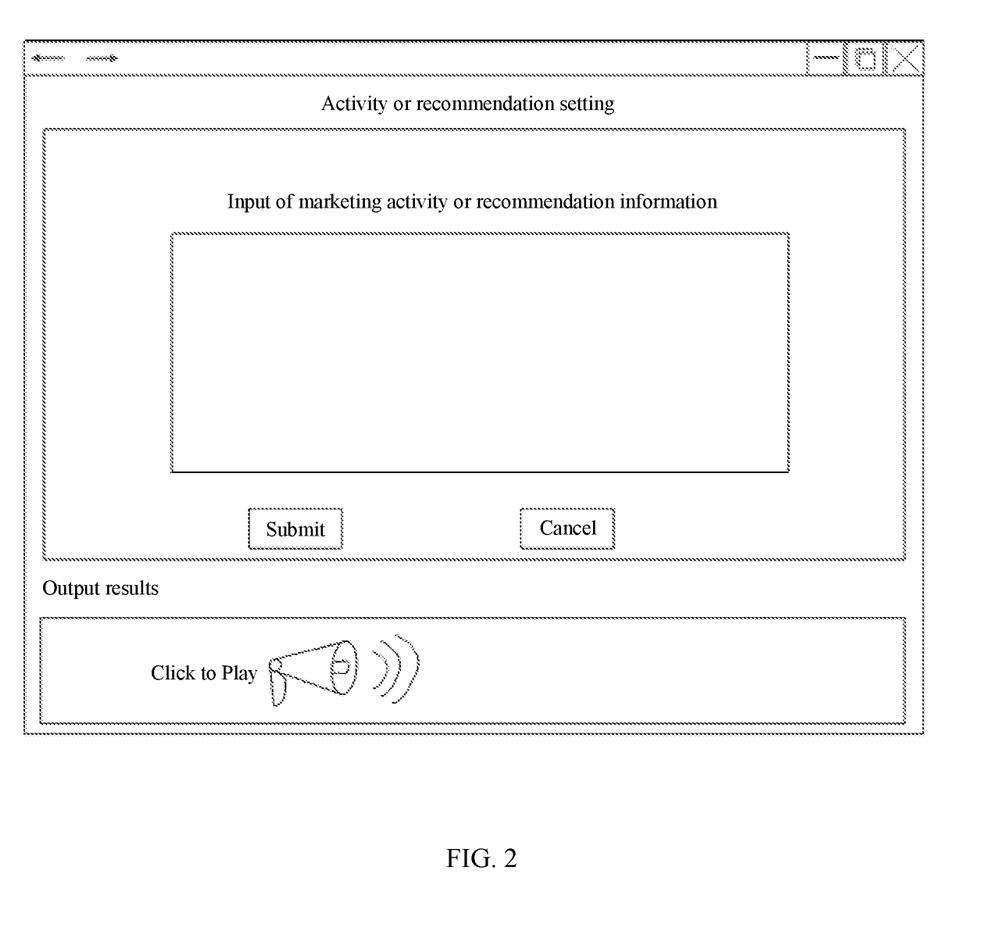
FIG. 2 is a schematic diagram of an activity or recommendation setting page according to some embodiments of the specification.

When mobile terminal devices are greatly developed, voice has become an underestimated marketing tool. The voice capability of operational IoT devices can be provided to merchants or users. This can also enhance the users' viscosity for the use of the corresponding machines and tools and drive sales. Based on the above description, corresponding setting page can be precompiled according to actual situations. As shown in FIG. 2, an input box for information about a merchant's or user's marketing activities, a Submit key, and a Cancel key can be included in this setting page. This setting page can be an independently developed single webpage or a page of an application (e.g., a page of a payment application). When a merchant or user is to promote a marketing activity or information, the merchant or user can open the above-described setting page using a browser or the above-described application installed on a terminal device, enter text data about this marketing activity or text data corresponding to the information in the input box of the above-described setting page, and click the Submit key on this setting page. Thus, the merchant's or user's terminal device can obtain the text data entered in the above-described input box and send the obtained text data to a server. The server can receive the text data from the merchant's or user's terminal device. A processing mechanism of converting text data into voice data can be set in the server so that after the server receives text data, every character in the text data can be converted into voice through this processing mechanism. In this way, the server can convert the text data into voice data and send the converted voice data to a specified IoT device. The specified IoT device can be selected by the merchant or user, or can be an IoT device of an end user who follows the merchant or user.

After the IoT device receives voice data from the server, the voice data can be output through an audio input component of the IoT device so that an end user of the IoT device can listen to the voice data to learn about the corresponding marketing activity information or information shared by the user. A voice data play rule can be set for an IoT device to achieve better play effects of voice data. The voice data can be played according to the set play rule. For example, the play starting time and play mode of the voice data can be set according to actual situations and an end user's habit. The play mode can include loop playing and random playing as well as a play end time and a play interval (e.g., playing once every 30 minutes), etc. Thus, a play rule of the voice data (i.e., a first play rule) can be so set. The IoT device then plays the voice data based on the first play rule, e.g., starting to play at 10:30 every day, once every 30 minutes, until the end of the play at 13:30.

The embodiments of the specification provide an information processing system that comprises a terminal device, a server, and one or more IoT devices, where the terminal device is configured to receive text data entered by the user and send the text data to the server, the server is configured to receive text data from the user, convert the text data into voice data, and send the converted voice data to the one or more IoT devices, and the one or more IoT devices are configured to receive voice data from the server and play the voice data according to a predetermined first play rule, the first play rule including a play starting time and a play mode. By converting text data into voice data and sending the voice data to corresponding IoT devices, the IoT devices can play the voice data according to a first play rule and users of the IoT devices can promptly learn about the corresponding information through the voice data. Therefore, the information recommendation efficiency can be improved, the users of the IoT devices can be notified of marketing information without delay, the users' viscosity for the use of the corresponding machines and tools can be enhanced, and sales can be driven.

Figure 3:
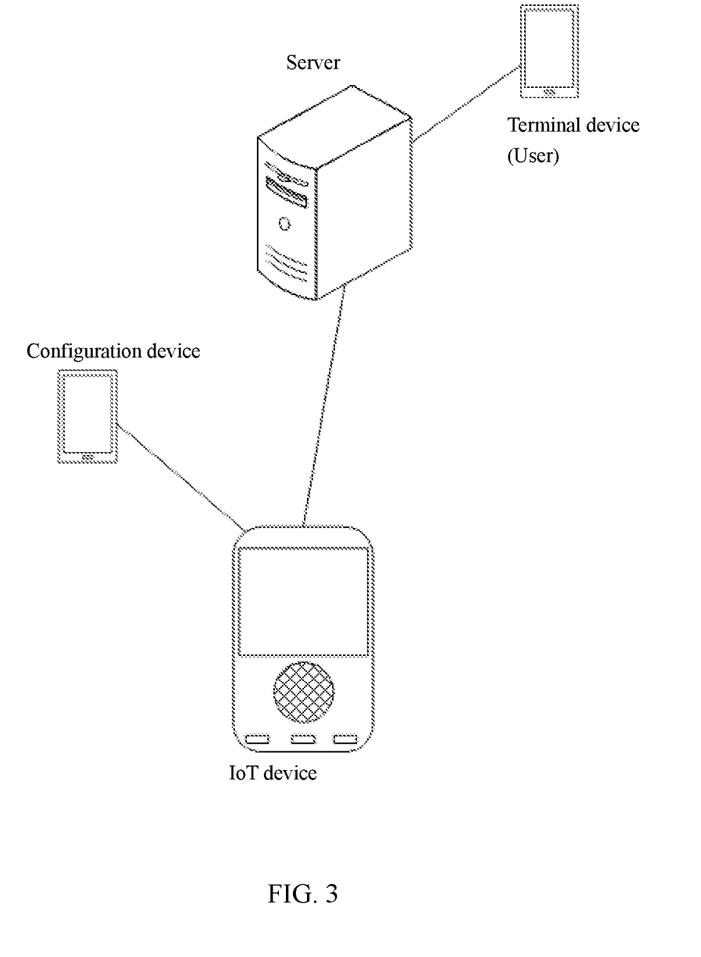
FIG. 3 illustrates another information processing system according to some embodiments of the specification.

As shown in FIG. 3, the embodiments of the specification provide an information processing system that may comprise a terminal device, a server, and an IoT device, where the terminal device may be a mobile terminal device such as a cell phone and a tablet computer or a device such as a PC, the server may include a single server or a server cluster including a plurality of servers, the IoT device may be a device in an IoT scenario and may be a smart air cleaner, a smart mattress, etc. This system may be configured to send marketing information to a corresponding IoT device and perform other processing. This system contains all function units of the information processing system as shown in FIGS. 1 and 2 and is improved based thereupon. The improvements are as follows.

The server may receive text data from a user, convert the text data into voice data, and send the converted voice data to the IoT device. The IoT device may receive the voice data from the server and play the voice data according to a predetermined first play rule, where the first play rule may include a play starting time and a play mode.

Further, after the text data is obtained from the user, the text data may be checked to ensure data security and that texts, words, or sentences violating some regulations are not contained in the text data. For example, the server may be further configured to perform risk control check on the above-described text data to determine whether one or more risk control keywords are contained in the text data.

Risk control keywords may be a single character, word, or sentence. Risk control keywords can be set according to predetermined laws and regulations or the current service requirements. This is not limited in the embodiments of the specification.

In some embodiments, after receiving text data from the user, the server may perform an analysis of the text data by querying whether risk control keywords are contained in the text data, to perform risk control check on the text data. If risk keywords are not found in the text data, it shows that the text data does not contain risk control keywords, i.e., the text data does not contain texts, words or sentences violating some regulations or service requirements. Thus, the server can determine that the text data does not contain risk control keywords. If one or more risk keywords are found in the text data, it shows that the text data includes one or more texts, words or sentences violating some regulations or service requirements. Thus, the server can determine that the text data contains risk control keywords. If the text data does not contain risk control keywords, the subsequent related processing may be performed. If the text data contains risk control keywords, the server may perform processing on the keywords contained in the text data, e.g., deleting the risk control keywords or replacing the risk control keywords with other characters (e.g., "*"), and then perform the subsequent related processing.

In addition, the IoT device can be a device for resource transfer. The resource transfer can be a process of transferring a resource from one resource account to another resource account. For example, the resource transfer can be payment. The IoT device can be a payment device accordingly. The IoT device can be configured with an audio component to receive audio data and perform decoding and playing of the audio data.

In addition to the audio component, the IoT device can include a display component and a video component. In this way, the IoT device can play images or videos through the display component. For example, the server may be further configured to receive image data and/or video data from the terminal device and send the image data and/or video data to the IoT device; the IoT device may be further configured to receive image data and/or video data from the server and play the image data and/or video data according to a predetermined second play rule, the second play rule including a play starting time and a play mode.

The second play rule can be the same as or different from the first play rule in the above-described embodiments. The second play rule can be set according to actual situations and an end user's habit. The play rule can include a play starting time and a play mode. The play mode can include loop playing and random playing as well as a play end time and a play interval (e.g., playing once every 30 minutes), etc. Thus, a play rule (i.e., a second play rule) can be so set. The IoT device can then play the image data and/or video data based on the second play rule, e.g., starting to play video data at 10:30 every day, once every 30 minutes, until the end of the play at 13:30.

In some embodiments, an input box for information about a merchant's or user's marketing activities, a Submit key, and a Cancel key can be included in the setting page as shown in FIG. 2 according to actual situations. This setting page can be an independently developed single webpage or a page of an application (e.g., a page of a payment application). When a merchant or user is to promote a marketing activity or information, the merchant or user can open the above-described setting page using a browser or the above-described application installed on a terminal device, enter image data and/or video data about this marketing activity in the input box of the above-described setting page, and click the Submit key on this setting page. Thus, the merchant's or user's terminal device can obtain the image data and/or video data entered in the above-described input box and send the obtained image data and/or video data to the server. The server can receive the image data and/or video data from the merchant's or user's terminal device. A processing mechanism of image data and/or video data can be set in the server. After the server receives image data and/or video data, the server can process the data contained in the image data and/or video data through this processing mechanism, causing an IoT device to display and play the corresponding image data and/or video data.

After the IoT device receives image data and/or video data from the server, the image data and/or video data can be output through a display component of the IoT device so that an end user of the IoT device can watch the image data or video data to learn about the corresponding marketing activity information or information shared by the user. In some embodiments, a play rule for image data or video data can be set for an IoT device to achieve better play effects of voice data. The image data and/or video data can be played according to the set play rule (i.e., a second play rule).

The second play rule can be a play rule for image data and/or video data or for image data and/or video data and voice data. For example, if data received by the IoT device includes audio data and image data, the audio data and image data can be played using the play rule. For example, if the second play rule is to play once every 30 minutes, then the audio data can be played first, the image data be played after 30 minutes, the audio data be played after another 30 minutes, the image data be played after another 30 minutes, . . . etc., until the end of the play time.

In addition, the play mode in the first play rule is a mode of playing at a fixed or non-fixed play interval and the play mode in the second play rule is a mode of playing at a fixed or non-fixed play interval, a random play mode, or a carousel mode.

The mode of playing at a non-fixed play interval can be playing at a random play interval (such as 5 minutes-10 minutes-30 minutes-12 minutes . . . etc.). The random play mode can be a play mode where one piece of data is randomly selected from multiple pieces of data to be played. The carousel mode can sort multiple pieces of data to be played in order and then play in the order of the sorted data. After the play of the last piece of the sorted data is finished, the IoT device can go back and again play in the order of the sorted data. This process is repeated until the end of the play time.

In addition, the above-described play rules (including the first play rule and the second play rule) can be flexibly configured by the end user according to actual situations. For example, the IoT device can be further configured to receive play rule configuration information from a configuration device and determine the first play rule and the second play rule according to the play rule configuration information.

The configuration device can be a device where an IoT device developer configures play rules, or a device where an IoT device end user sets or modifies play rules, or a device where an IoT device performs remote program upgrading. For example, the configuration device can be a terminal device, server, etc. This is not limited in the embodiments of the specification.

In some embodiments, a play rule configuration page can be set according to actual situations. An input box for play rule configuration information, a Submit key, and a Cancel key can be included in this configuration page. This configuration page can be an independently developed single webpage or a page of an application. When an end user is to set or modify play rules, the end user can open the above-described configuration page using a browser or the above-described application installed on a configuration device, enter any set or modified play rules (e.g., a first play rule and/or a second play rule) in the input box of the above-described configuration page, and then click the Submit key on this configuration page. Thus, the end user's IoT device can obtain the set or modified play rules entered in the above-described input box and replace the current corresponding play rules with the obtained play rules.

After receiving audio data, image data or video data, the IoT device can play the audio data, image data or video data according to the above-described set or modified play rules.

In addition, different play rules can be set for voice data of different services according to actual situations in the actual applications. Voice data for different services may have different content attributes. For example, the corresponding play rule for the financial service (e.g., financial related content) can be set to play once every 10 minutes with the play starting time at 9:00 every day and the end time at 15:00 every day; the corresponding play rule for the insurance service (e.g., insurance related content) can be set to play once every 30 minutes with the play starting time at 18:00 every day and the end time at 22:00 every day. Therefore, different service types can be set, each corresponding to a play rule. For the details, refer to the following related contents: the IoT device can receive voice data from the server, determine a service type associated with the voice data and a first play rule matching the service type, and play the voice data based on the first play rule.

In some embodiments, a matching relationship between a service type and a play rule can be pre-stored in the IoT device in a form of table. For the details, refer to the following Table 1.

TABLE 1

| Content Attribute Type | Play Rule |
| --- | --- |
| Financial service type | Playing once every 10 minutes with the play starting time at 9:00 every day and the end time at 15:00 every day |
| Insurance service type | Playing once every 30 minutes with the play starting time at 18:00 every day and the end time at 22:00 every day |
| Game service type | Playing irregularly with the play starting time at 18:00 every day and the end time at 22:00 every day |

After the IoT device receives voice data from the server, the IoT device can analyze the voice data and determines a service type corresponding to the service associated with the voice data, or the server can send to the IoT device a service type corresponding to the service associated with the voice data. After obtaining the service type of the voice data, the IoT device can obtain a first play rule matching the service type from the relation as shown in the above-described Table 1 and play the voice data based on the first play rule.

The embodiments of the specification provide an information processing system that comprises a terminal device, a server, and one or more IoT devices, where the terminal device is configured to receive text data entered by the user and send the text data to the server, the server is configured to receive the text data from the user, convert the text data into voice data, and send the converted voice data to the one or more IoT devices, and the one or more IoT devices are configured to receive the voice data from the server and play the voice data according to a predetermined first play rule, the first play rule including a play starting time and a play mode. In this way, by converting text data into voice data and sending the voice data to the corresponding IoT devices, the IoT devices can play the voice data according to a first play rule and users of the IoT devices can promptly learn about the corresponding information through the voice data. Therefore, the information recommendation efficiency can be improved, the users of the IoT devices can be notified of marketing information without delay, the users' viscosity for the use of the corresponding machines and tools can be enhanced, and sales can be driven.

Figure 4:
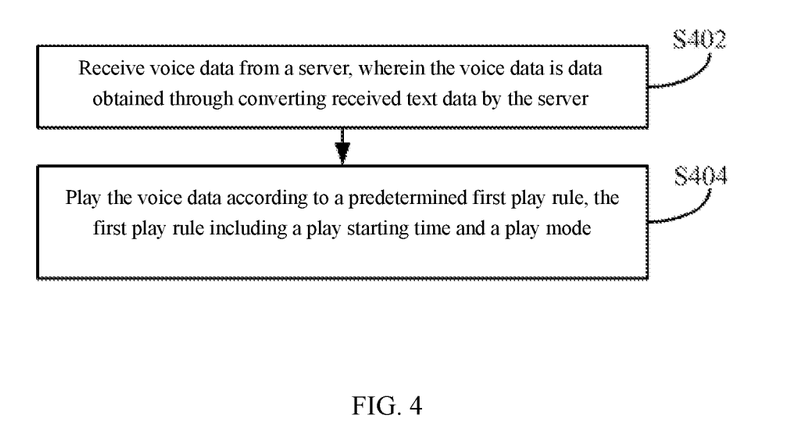
FIG. 4 illustrates a method of processing voice data by an IoT device according to some embodiments of the specification.

As shown in FIG. 4, the embodiments of the specification provide a method of processing voice data by an IoT device. The executive body of the method can be an IoT device, which can be a cell phone, a smart air cleaner, a smart mattress, etc. This method can be configured to receive and play marketing information sent by a server and perform other processing. For example, this method may include the following steps.

In Step S402, the method may include receiving voice data from a server, where the voice data is data obtained through converting received text data by the server.

The server can be a back-end server for data processing and sending, or a server for providing services related to the IoT device, or a back-end server for resource transfer (e.g. a back-end server for payment, account transfer and other financial services), etc. In some embodiments, the server can be a back-end server for resource transfer and can also be configured to convert text data into voice data.

In some embodiments, a corresponding setting page can be precompiled. As shown in FIG. 2, an input box for information about a merchant's or user's marketing activities, a Submit key, and a Cancel key can be included in this setting page. When a merchant or user is to promote a marketing activity or information, the merchant or user can open the above-described setting page using a terminal device, enter text data about this marketing activity or text data corresponding to the information in the input box of the above-described setting page, and click the Submit key on this setting page. Thus, the merchant's or user's terminal device can obtain the text data entered in the above-described input box and send the obtained text data to the server. A processing mechanism of converting text data into voice data can be set in the server. After the server receives text data, every character in the text data can be converted into voice through this processing mechanism and the converted voice data can be sent to a specified IoT device. The IoT device can receive the voice data from the server.

The server can send the converted voice data to a specified IoT device and that the specified IoT device can be selected by a merchant or user or be preset by a technical person. The server can also send the converted voice data to an IoT device where an application for a service is installed.

In Step S404, the method may include playing the voice data according to a predetermined first play rule, the first play rule including a play starting time and a play mode.

In some embodiments, after the IoT device receives voice data from the server, the voice data can be output through an audio input component of the IoT device so that an end user of the IoT device can listen to the voice data to learn about the corresponding marketing activity information or information shared by the user. In addition, the play starting time and play mode of the voice data can be set according to actual situations and an end user's habit. The play mode can include loop playing and random playing as well as a play end time and a play interval.

The embodiments of the specification provide a method of processing voice data, performed by an IoT device. The method may include receiving voice data from a server, where the voice data is data obtained through converting received text data by the server; playing the voice data according to a predetermined first play rule, where a play starting time and play mode are included in the first play rule. By converting text data into voice data and sending the voice data to the corresponding IoT devices, the IoT devices can play the voice data according to a first play rule and users of the IoT devices can promptly learn about the corresponding information through the voice data. Therefore, the information recommendation efficiency can be improved, the users of the IoT devices can be notified of marketing information without delay, the users' viscosity for the use of the corresponding machines and tools can be enhanced, and sales can be driven.

Figure 5:
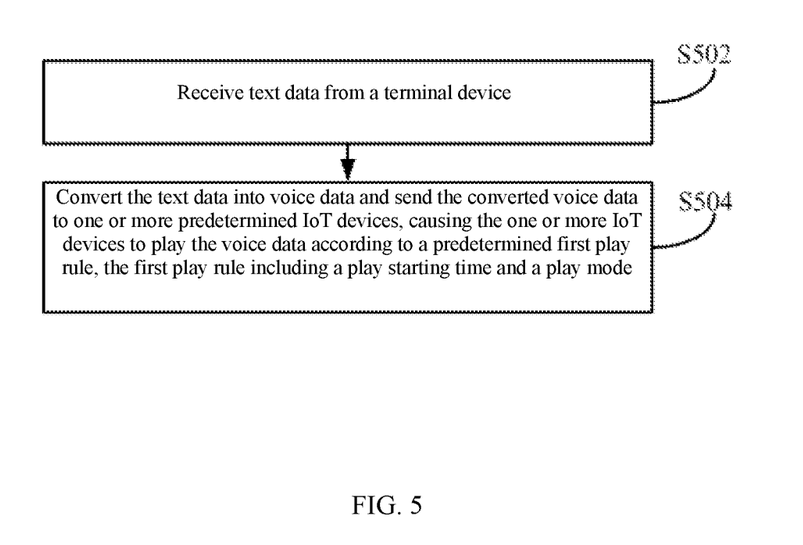
FIG. 5 illustrates an information processing method according to some embodiments of the specification.

As shown in FIG. 5, the embodiments of the specification provide an information processing method. The executive body of the method is a server, which can include a single server or a server cluster including a plurality of servers. The server can be a back-end server for data processing and sending, or a server for providing services related to the IoT device, or a back-end server for resource transfer (e.g. a back-end server for payment, account transfer and other financial services), etc. In some embodiments, the server can be a back-end server for resource transfer and can also be configured to convert text data into voice data. This method can be configured to send marketing information to the corresponding IoT devices and perform other processing. For example, this method may include the following steps.

In Step S502, the method may include receiving text data from a terminal device.

In Step S504, the method may include converting the text data into voice data and sending the converted voice data to one or more predetermined IoT devices, causing the one or more IoT devices to play the voice data according to a predetermined first play rule, the first play rule including a play starting time and play mode.

For the processes of the above-described Steps S502 and S504, related contents of the above-described Embodiments can be referenced.

The embodiments of the specification provide an information processing method, comprising receiving text data from a terminal device, converting the text data into voice data, sending the converted voice data to one or more predetermined IoT devices, causing the one or more IoT devices to play the voice data according to a predetermined first play rule. By converting text data into voice data and sending the voice data to the corresponding IoT devices, the IoT devices can play the voice data according to a first play rule and users of the IoT devices can promptly learn about the corresponding information through voice data. Therefore, the information recommendation efficiency can be improved, the users of the IoT devices can be notified of marketing information without delay, the users' viscosity for the use of the corresponding machines and tools can be enhanced, and sales can be driven.

Figure 6:
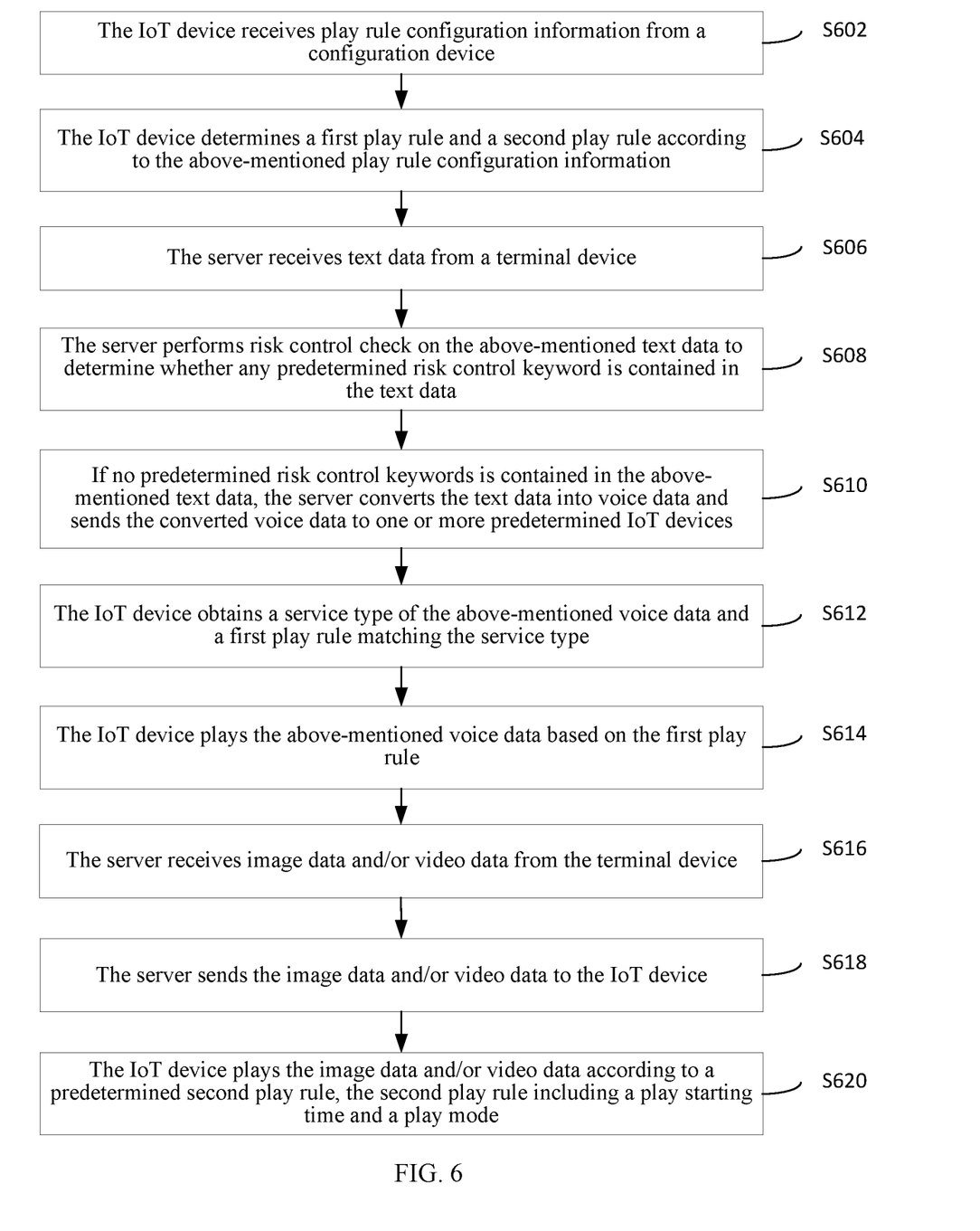
FIG. 6 illustrates another information processing method according to some embodiments of the specification.

As shown in FIG. 6, the embodiments of the specification provide an information processing method. This method may be jointly executed by an IoT device and a server. The IoT device can be a smart air cleaner, a smart mattress, etc. The server can include a single server or a server cluster including a plurality of servers. This method can be configured to send marketing information to the corresponding IoT device and the IoT device can receive and play the marketing information and performs other processing. For example, this method may include the following steps.

In Step S602, the IoT device receives play rule configuration information from a configuration device.

The configuration device can be any device, e.g., a mobile terminal device such as a cell phone and a tablet computer or a terminal device such as a PC.

In some embodiments, a play rule configuration page can be set according to actual situations. The configuration page may include an input box for play rule configuration information, a Submit key, a Cancel key, etc. When an end user is to set or modify play rules, the end user can open the above-described configuration page, enter any set or modified play rules in the input box of the above-described configuration page, and click the Submit key in this configuration page. Thus, the end user's IoT device can obtain the set or modified play rules entered in the above-described input box and generate play rule configuration information.

In Step S604, the IoT device determines the first play rule and the second play rule according to the above-mentioned play rule configuration information.

The play mode in the first play rule can be a mode of playing at a fixed or non-fixed play interval and the play mode in the second play rule can be a mode of playing at a fixed or non-fixed play interval, a random play mode, or a carousel mode.

In some embodiments, an audio data play rule, i.e., a first play rule, and an image data and/or video data play rule, i.e., a second play rule, can be determined according to the above-described play rule configuration information. The first play rule can be the same as or different from the second play rule in the actual applications. For example, when data to be played includes audio data, image data, video data, or a combination thereof, the data can be played using the same play rule.

In Step S606, the server receives text data from a terminal device.

In Step S608, the server performs risk control check on the above-mentioned text data to determine whether any predetermined risk control keyword is contained in the text data.

In Step S610, if no predetermined risk control keyword is contained in the above-mentioned text data, the server converts the text data into voice data and sends the converted voice data to one or more predetermined IoT devices.

In Step S612, the IoT device obtains a service type of the above-mentioned voice data and a first play rule matching the service type.

In some embodiments, different play rules can be set for voice data of different services according to actual situations in the actual applications, i.e., different service types can be set and each can correspond to a respective play rule. For details, the above-described related contents can be referenced.

In Step S614, the IoT device plays the above-mentioned voice data based on the first play rule.

In Step S616, the server receives image data and/or video data from the terminal device. In some embodiments, when a merchant or user is to promote a marketing activity or information, the merchant or user can open the above-described setting page using a terminal device, enter image data and/or video data about this marketing activity in the input box of the above-described setting page, and click the Submit key in this setting page. Thus, the merchant's or user's terminal device can obtain the image data or video data entered in the above-described input box and send the obtained image data or video data to the server. The server can receive the image data or video data from the merchant's or user's terminal device.

In Step S618, the server sends the image data and/or video data to the IoT device.

In Step S620, the IoT device plays the image data and/or video data according to a predetermined second play rule, the second play rule including a play starting time and a play mode.

In some embodiments, after the IoT device receives image data or video data from the server, the image data or video data can be output through a display component of the IoT device according to the second play rule so that an end user of the IoT device can watch the image data or video data to learn about the corresponding marketing activity information or information shared by the user.

The embodiments of the specification provide an information processing method, comprising receiving text data from a terminal device, converting the text data into voice data, sending the converted voice data to one or more predetermined IoT devices by a server so that the one or more IoT devices play the voice data according to a predetermined first play rule. By converting text data into voice data and sending the voice data to the corresponding IoT devices, the IoT devices can play the voice data according to a first play rule and the users of the IoT devices can promptly learn about the corresponding information through voice data. Therefore, the information recommendation efficiency can be improved, the users of the IoT devices can be notified of marketing information without delay, the users' viscosity for the use of the corresponding machines and tools can be enhanced, and sales can be driven.

Figure 7:
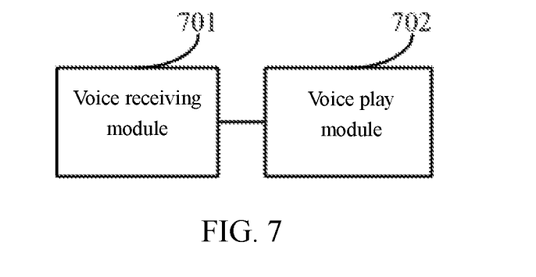
FIG. 7 illustrates a voice data processing apparatus according to some embodiments of the specification.

The above is an information processing method provided by the embodiments of the specification. Based on the same idea, the embodiments of the specification also provide a voice data processing apparatus, as shown in FIG. 7. The voice data processing apparatus may include a voice receiving module 701 and a voice play module 702.

The voice receiving module 701 is configured to receive voice data from a server, where the voice data is data obtained through converting received text data by the server. The voice play module 702 is configured to play the voice data according to a predetermined first play rule 702, where the first play rule includes a play starting time and a play mode.

In some embodiments, the apparatus may further include: a data receiving module, configured to receive image data and/or video data from the server; a data play module, configured to play the image data and/or video data according to a predetermined second play rule, where the second play rule includes a play starting time and play mode.

The play mode in the first play rule may be a mode of play at a fixed or non-fixed play interval and the play mode in the second play rule may be a mode of playing at a fixed or non-fixed play interval, a random play mode, or a carousel mode.

In some embodiments, the apparatus may further include: a configuration receiving module, configured to receive play rule configuration information from a configuration device; a rule determining module, configured to determine the first play rule and the second play rule according to the play rule configuration information.

In some embodiments, the voice play module 702 may include: a rule obtaining module, configured to obtain a service type of the voice data and the first play rule matching the service type; a voice play unit, configured to play the voice data based on the first play rule.

The embodiments of the specification provide a voice data processing apparatus, comprising receiving voice data from a server, where the voice data is data obtained through converting received text data by the server; playing the voice data according to a predetermined first play rule, where the first play rule includes a play starting time and a play mode. By converting text data into voice data and sending the voice data to a corresponding IoT device, the IoT device can play the voice data according to a first play rule and the user of the IoT device can promptly learn about the corresponding information through voice data. Therefore, the information recommendation efficiency can be improved, the user of the IoT device can be notified of marketing information without delay, the user's viscosity for the use of the corresponding machines and tools can be enhanced, and sales can be driven.

Figure 8:
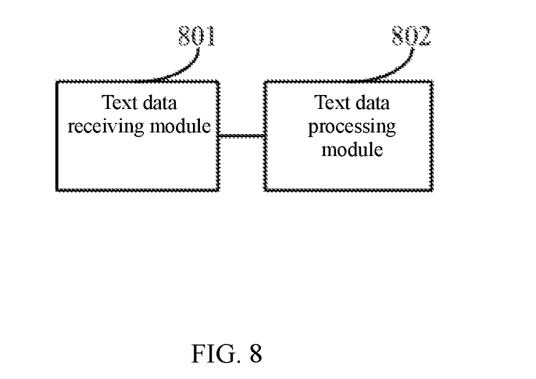
FIG. 8 illustrates an information processing apparatus according to some embodiments of the specification.

Based on the same idea, the embodiments of the specification also provide an information processing apparatus, as shown in FIG. 8. The information processing apparatus can be a server in the above-described embodiments. This server can be a back-end server for data processing and sending, or a server for providing services related to IoT devices, or a back-end server for resource transfer (e.g. a back-end server for payment, transfer and other financial services), etc. In some embodiments, the server can be a back-end server for resource transfer and can also be configured to convert text data into voice data.

The information processing apparatus may include a text data receiving module 801 and a text data processing module 802. The text data receiving module 801 is configured to receive text data from a terminal device. The text data processing module 802 is configured to convert the text data into voice data and send the converted voice data to one or more predetermined IoT devices so that the one or more IoT devices play the voice data according to a predetermined first play rule, where the first play rule includes a play starting time and a play mode.

In some embodiments, the text data processing module 802 may include: a check unit, configured to perform risk control check on the text data to determine whether predetermined risk control keywords are contained in the text data; a conversion unit, configured to convert the text data into voice data provided that predetermined risk control keywords are not contained in the text data.

In some embodiments, the apparatus may further include: an image data receiving module, configured to receive image data and/or video data from the terminal device; an image data sending module, configured to send the image data and/or video data to a IoT device so that the IoT device plays the image data and/or video data according to a predetermined second play rule, where the second play rule includes a play starting time and a play mode.

The embodiments of the specification provide an information processing apparatus, comprising receiving text data from a terminal device, converting the text data into voice data, sending the converted voice data to one or more predetermined IoT devices so that the one or more IoT devices play the voice data according to a predetermined first play rule. By converting text data into voice data and sending the voice data to a corresponding IoT device, the IoT device can play the voice data according to a first play rule and the user of the IoT device can promptly learn about the corresponding information through voice data. Therefore, the information recommendation efficiency can be improved, the user of the IoT device can be notified of marketing information without delay, the user's viscosity for the use of the corresponding machines and tools can be enhanced, and sales can be driven.

Figure 9:
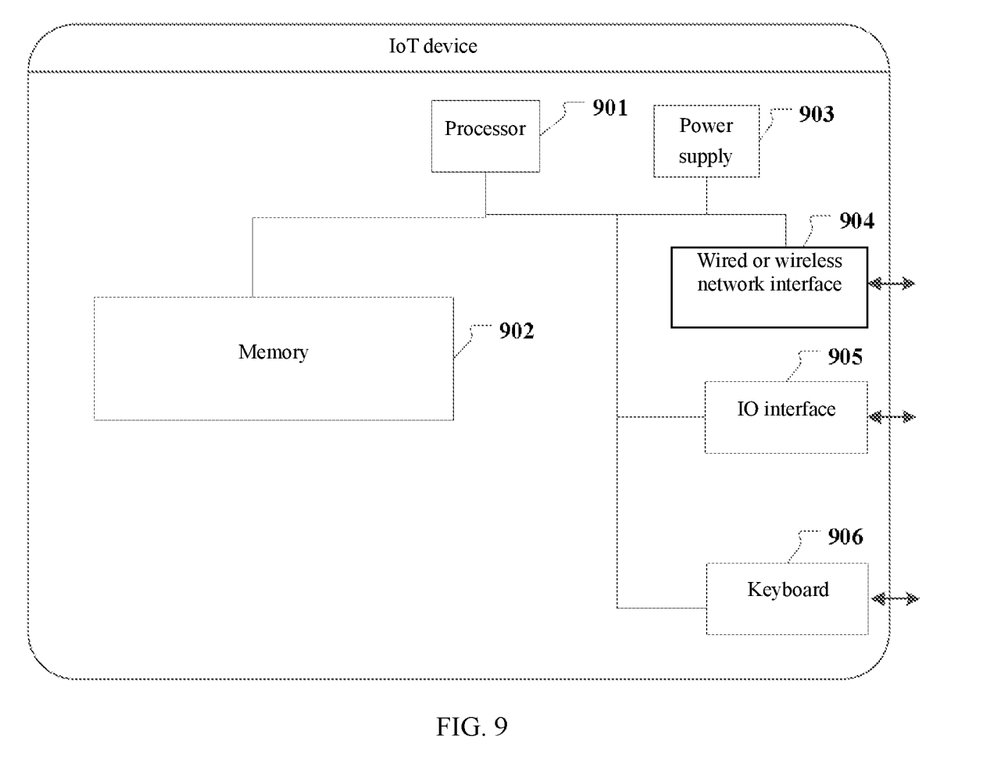
FIG. 9 illustrates an IoT device according to some embodiments of the specification.

The above described is an information processing apparatus provided by the embodiments of the specification. Based on the same idea, the embodiments of the specification also provide an IoT device, as shown in FIG. 9.

The IoT device may considerably vary due to the configuration or performance difference and may include one or more processors 901 and memories 902. One or more storage applications or data may be stored in a memory 902. The memory 902 may be a temporary or permanent storage. The applications stored in the memory 902 may each include one or more modules (not shown in the figure), and each module may include a series of computer executable instructions for the IoT device. Furthermore, the processor 901 can be configured to communicate with the memory 902 and a series of computer executable instructions in the memory 902 are executed on the IoT device. The IoT device may further comprise one or more power supplies 903, one or more wired or wireless network interfaces 904, one or more IO interfaces 905, and one or more keyboards 906.

In some embodiments, the IoT device includes memory and one or more programs. The one or more programs are stored in the memory and may include one or more modules, and each module may include a series of computer executable instructions for the IoT device. The one or more programs containing the computer executable instructions can be configured to be executed by one or more processors, to cause the one or more processors to perform the following operations: receiving voice data from a server, the voice data being data obtained through converting received text data by the server; playing the voice data according to a predetermined first play rule, where the first play rule includes a play starting time and a play mode.

In some embodiments, after the play of the voice data according to a predetermined first play rule, the operations further include: receiving image data and/or video data from the server; playing the image data and/or video data according to a predetermined second play rule, where the second play rule includes a play starting time and play mode.

In some embodiments, the play mode in the first play rule is a mode of playing at a fixed or non-fixed play interval and the play mode in the second play rule is a mode of playing at a fixed or non-fixed play interval, a random play mode, or a carousel mode.

In some embodiments, before playing the voice data according to a predetermined first play rule, the operations further comprise: receiving play rule configuration information from a configuration device; determining the first play rule and the second play rule according to the play rule configuration information.

In some embodiments, playing of the voice data according to a predetermined first play rule comprises: obtaining a service type of the voice data and the first play rule matching the service type; playing the voice data based on the first play rule.

The embodiments of the specification provide an IoT device, comprising receiving voice data from a server, where the voice data is data obtained through converting received text data by the server; playing the voice data according to a predetermined first play rule, where the first play rule includes a play starting time and a play mode. By converting text data into voice data and sending the voice data to a corresponding IoT device, the IoT device can play the voice data according to a first play rule and the user of the IoT device can promptly learn about the corresponding information through voice data. Therefore, the information recommendation efficiency can be improved, the user of the IoT device can be notified of marketing information without delay, the user's viscosity for the use of the corresponding machines and tools can be enhanced, and sales can be driven.

Figure 10:
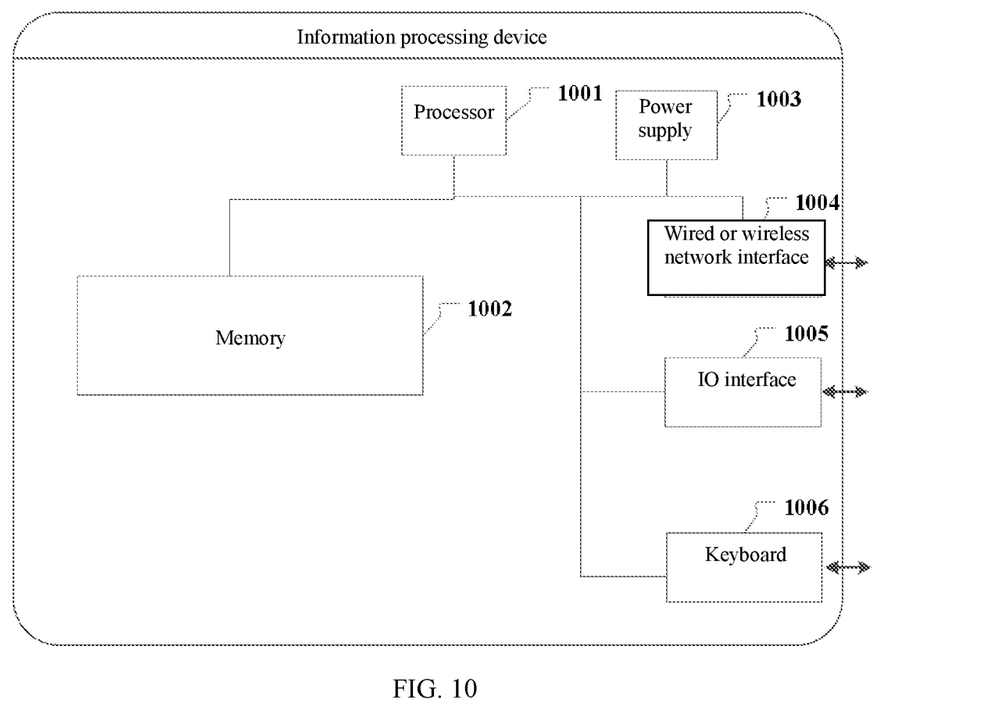
FIG. 10 illustrates an information processing device according to some embodiments of the specification.

Based on the same idea, the embodiments of the specification also provide an information processing device, as shown in FIG. 10.

The information processing device may be a server provided in the above-described embodiments. This server may be a back-end server for data processing and sending, or a server for providing services related to a IoT device, or a back-end server for resource transfer (e.g. a back-end server for payment, transfer and other financial services), etc. In some embodiments, the server can be a back-end server for resource transfer and can also be configured to convert text data into voice data.

The information processing device may considerably vary due to the configuration or performance difference and may include one or more processors 1001 and memories 1002. One or more storage applications or data may be stored in a memory 1002. The memory 1002 may be a temporary or permanent storage. The applications stored in the memory 1002 may each include one or more modules (not shown in the figure), and each module may include a series of computer executable instructions for the information processing device. Furthermore, the processor 1001 can be configured to communicate with the memory 1002 and a series of computer executable instructions in the memory 1002 are executed on the information processing device. The information processing device may further comprise one or more power supplies 1003, one or more wired or wireless network interfaces 1004, one or more IO interfaces 1005, and one or more keyboards 1006.

In some embodiments, the information processing device includes a memory and one or more programs. The one or more programs are stored in the memory and include one or more modules, and each module may include a series of computer executable instructions for the information processing device. The one or more programs contain the computer executable instructions can be configured to be executed by one or more processors, to cause the one or more processors to perform the following operations: receiving text data from a terminal device; converting the text data into voice data and sending the converted voice data to one or more predetermined IoT devices so that the one or more IoT devices play the voice data according to a predetermined first play rule, where the first play rule includes a play starting time and a play mode.

In some embodiments, converting the text data into voice data comprises: performing risk control check on the text data to determine whether predetermined risk control keywords are contained in the text data; converting the text data into voice data provided that predetermined risk control keywords are not contained in the text data.

In some embodiments, the operations further comprise: receiving image data and/or video data from the terminal device; sending the image data and/or video data to the one or more IoT devices so that the one or more IoT devices play the image data and/or video data according to a predetermined second play rule, where the second play rule includes a play starting time and a play mode.

The embodiments of the specification provide an information processing device, comprising receiving text data from a terminal device, converting the text data into voice data, sending the converted voice data to one or more predetermined IoT devices so that the one or more IoT devices play the voice data according to a predetermined first play rule. By converting text data into voice data and sending the voice data to corresponding IoT devices, the IoT devices can play the voice data according to a first play rule and the users of the IoT devices can promptly learn about the corresponding information through voice data. Therefore, the information recommendation efficiency can be improved, the users of the IoT devices can be notified of marketing information without delay, the users' viscosity for the use of the corresponding machines and tools can be enhanced, and sales can be driven.

Some embodiments of the specification are described above. Other embodiments are in the scope of the attached claims. In some embodiments, the actions or steps recorded in the claims can be executed in a sequence different from those in the embodiments and still achieve the expected results. In addition, the process described in the drawings is not necessarily performed in the shown or continuous sequence to achieve the expected results. Multitask processing and parallel processing are allowed or may be beneficial in some embodiments.

Improvements on a technology can be substantially distinguished between hardware improvements (e.g., improvements on circuit structures such as diodes, transistors and switches) and software improvements (e.g. improvements on methods and processes) in the 1990s. With the development of technology, however, improvements on many of today's methods and processes can be regarded as direct improvements on hardware circuit structures. Designers almost always program the improved methods and processes into hardware circuits to obtain the corresponding hardware circuit structures. Therefore, it cannot be said that an improvement on a method and process cannot be implemented with hardware entity modules. For example, a Programmable Logic Device (PLD) (e.g. a Field Programmable Gate Array (FPGA)) is an integrated circuit whose logical function is determined by the user programming the device. A designer can "integrate" a digital system into a single PLD by programming, without the necessity of asking a chip manufacturer to design and make a dedicated IC chip. Instead of manually making an IC chip, this programming is implemented mostly by using a "logic compiler" software now. It is similar to a software compiler configured during the program development compilation and the original codes before compilation can be also compiled using a specific programming language called the Hardware Description Language (HDL). A plurality of HDLs are available, including ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM and RHDL (Ruby Hardware Description Language). Currently, VHDL (Verilog) and Verilog are mostly configured. One of ordinary skill in the art shall also be aware that a hardware circuit implementing logical methods and processes can be easily obtained by logically programming the methods and processes slightly into an integrated circuit by using the above-described several HDLs.

A controller can be implemented in any suitable way. For example, a controller can take the form of a microprocessors or processor and a computer-readable medium storing computer-readable program codes (e.g., software or firmware) executed by the (micro)processor, a logic gate, a switch, an Application Specific Integrated Circuits (ASICs), a programmable logic controller and an embedded microcontroller. The examples of controllers include, but are not limited to, the following microcontrollers: ARC 625D, Atmel AT91SAM, Microchip PIC18F26K20 and Silicone Labs C8051F320. A memory controller can also be implemented as part of the memory control logic. One of ordinary skill in the art also knows that in addition to implementing a controller in the form of pure computer-readable program codes, a controller can implement the same function in the form of a logic gate, a switch, an ASIC, a programmable logic controller and an embedded microcontroller by logically programming methods and steps. Therefore, such a controller can be deemed as a hardware component, and an apparatus included in it for implementing various functions can also be deemed as a structure in the hardware component. Alternatively, an apparatus for implementing various functions can even be deemed as both a software module for implementing methods and a structure in the hardware component.

The system, apparatus, module, or unit described in the above-described embodiments may be implemented by a computer chip or entity, or by a product having a certain function. A computer is a typical implementation device. For example, a computer can be, for example, a PC, a laptop, a cell phone, a camera phone, a smart phone, a personal digital assistant, a media player, a navigation device, an email device, a game console, a tablet computer, a wearable device, or any combination thereof.

For the convenience of description, the above-described apparatus is divided into various units for respective description. Of course, the functions of each unit can be implemented in one or more pieces of software and/or hardware during the implementation of one or more embodiments of the specification.

Those skilled in the art shall be aware that embodiments of the specification can be provided as a method, system, or computer program product. Therefore, one or more embodiments of the specification can be in the form of a full hardware embodiment, a full software embodiment, or an embodiment combining hardware and software. Furthermore, one or more embodiments of the specification can take the form of a computer program product implemented on one or more computer-usable storage media (including, but not limited to, disk memories, CD-ROMs and optical memories) containing computer-usable program codes.

The embodiments of the specification are described by referring to the flowcharts and/or block diagrams of the methods, devices (systems) and computer program products according to the embodiments of the specification. It shall be understood that every process and/or box in the flowcharts and/or block diagrams and the combination of the processes and/or boxes in the flowcharts and/or block diagrams can be implemented by computer program instructions. These computer program instructions can be provided to a general-purpose computer, a dedicated computer, an embedded processor or other programmable information processing device processors to generate a machine so that a device for implementing any functions described in one or more processes in the flowcharts and/or one or more boxes in the block diagrams is generated through instructions executed by the computer or other programmable information processing device processors.

These computer program instructions can also be stored in a computer-readable memory that boots a computer or other programmable information processing devices to work in a particular way so that instructions stored in the computer-readable memory generate a manufacturing product including an instruction apparatus. The instruction apparatus implements any functions described in one or more processes in the flowcharts and/or one or more boxes in the block diagrams.

These computer program instructions can also be loaded into a computer or other programmable information processing devices to execute a series of operating steps in the computer or other programmable devices to generate processing implemented by the computer. Therefore, instructions executed on the computer or other programmable devices provide steps to implement any functions described in one or more processes in the flowcharts and/or one or more boxes in the block diagrams.

In a typical configuration, the computing device includes one or more processors (PPUs), IO interfaces, network interfaces, and memories.

Memories may include volatile memories, RAMs, and/or non-volatile memories and other forms of computer readable media, such as ROMs or flash RAMs. A memory is an example of computer readable media.

Computer readable media include non-volatile and volatile, removable and non-removable media and achieve information storage using any method or technology. Information can be computer-readable instructions, data structures, program modules or other data. Examples of computer storage media include, but are not limited to, PRAMs, SRAMs, DRAMs and other types of RAMs, ROMs, EEPROM, flash memories or other memory technologies, CD-ROMs, DVDs or other optical memories, cassette tapes, tape or disk memories or other magnetic storage devices or any other non-transmission media. Computer storage media are configured to store information that can be accessed by computing devices. As defined in this article, computer-readable media do not include transitory media, e.g. modulated data signals and carriers.

It is also important to note that the terms "comprise," "contain" or any of its other variants are intended to cover a non-exclusive inclusion so that a process, method, commodity or device includes both those elements and other elements not listed, or also include inherent elements of the process, method, commodity or device. In the absence of more restrictions, any element defined by the sentence "comprise a . . . " does not exclude the existence of other identical elements in a process, method, commodity or device that include the element.

One of ordinary skill in the art shall be aware that embodiments of the specification can be provided as a method, system or computer program product. Therefore, one or more embodiments of the specification can be in the form of a full hardware embodiment, a full software embodiment, or an embodiment combining hardware and software. Furthermore, one or more embodiments of the specification can take the form of a computer program product implemented on one or more computer-usable storage media (including, but not limited to, disk memories, CD-ROMs and optical memories) containing computer-usable program codes.

One or more embodiments of the specification can be described in the general context of computer executable instructions executed by a computer, such as program modules. Program modules generally include routines, programs, objects, components, data and structures that perform specific tasks or implement specific abstract data types. One or more embodiments of the specification can be practiced in distributed computing environments where tasks are performed by remote processing devices connected through communication networks. In distributed computing environments, program modules can be in local and remote computer storage media including storage devices.

Each embodiment of the specification is described in a progressive manner. The same and similar part between the embodiments can be mutually referred to. Each embodiment highlights the difference from other embodiments. Especially the system embodiments are basically similar to the method embodiments, so the description is relatively simple. For related portions, the descriptions of the method embodiments can be referenced.

The foregoing are the embodiments of the specification and are not intended to limit the specification. For one of ordinary skill in the art, the specification may have various alterations and changes. Any modifications, substitutions, improvements, etc., made within the spirit and principle of the specification shall be included in the scope of the claims of the specification.

What is claimed is:

1. A system, comprising:
a hardware processor; and
a non-transitory machine-readable storage medium encoded with instructions executable by the hardware processor to perform operations comprising:
receiving, by a server, text data for multiple services each having a different content attribute;
determining, by the server, whether one or more risk control keywords are contained in the text data, the one or more risk control keywords set according to a predetermined regulation or service requirement;
in response to determining that the one or more risk control keywords are contained in the text data, processing, by the server, the text data by: deleting the one or more risk control keywords from the text data, or replacing the one or more risk control keywords with one or more characters;

converting, by the server, the processed text data to voice data;

transmitting, from the server to an Internet of Things (IoT) device, the voice data for the IoT device to play the voice data; and transmitting, from the server to the IoT device, first play rule configuration for the IoT device to determine multiple first play rules for playing the voice data, wherein each first play rule includes a time of day to start playback and a play mode for voice data having a corresponding one of the multiple services.

2. The system of claim 1, the operations further comprising:
transmitting, by the server, image data or video data to the IoT device for the IoT device to play the image data or the video data.

3. The system of claim 2, the operations further comprising:
transmitting, by the server, second play rule configuration information to the IoT device for the IoT device to determine a second play rule for playing the image data or the video data.

4. The system of claim 3, wherein the second play rule includes a second time of day to start playback and a second play mode.

5. The system of claim 3, wherein the first play rule configuration information and the second play rule configuration information are the same.

6. A non-transitory machine-readable storage medium encoded with instructions executable by one or more hardware processors of a computing component, the machine-readable storage medium comprising instructions to cause the one or more hardware processors to perform operation comprising:

receiving, by a server, text data for multiple services each having a different content attribute;

determining, by the server, whether one or more risk control keywords are contained in the text data, the one or more risk control keywords set according to a predetermined regulation or service requirement;

in response to determining that the one or more risk control keywords are contained in the text data, processing, by the server, the text data by: deleting the one or more risk control keywords from the text data, or replacing the one or more risk control keywords with one or more characters;

converting, by the server, the processed text data to voice data;

transmitting, from the server to an Internet of Things (IoT) device, the voice data for the IoT device to play the voice data; and transmitting, from the server to the IoT device, first play rule configuration for the IoT device to determine multiple first play rules for playing the voice data, wherein each first play rule includes a time of day to start playback and a play mode for voice data having a corresponding one of the multiple services.

7. The non-transitory machine-readable storage medium of claim 6, the operations further comprising:
transmitting, by the server, image data or video data to the IoT device for the IoT device to play the image data or the video data.

8. The non-transitory machine-readable storage medium of claim 7, the operations further comprising: transmitting, by the server, second play rule configuration information to the IoT device for the IoT device to determine a second play rule for playing the image data or the video data.

9. The non-transitory machine-readable storage medium of claim 8, wherein the second play rule includes a second time of day to start playback and a second play mode.

10. The non-transitory machine-readable storage medium of claim 8, wherein the first play rule configuration information and the second play rule configuration information are the same.

11. A method, comprising:
receiving, by a server, text data for multiple services each having a different content attribute;

determining, by the server, whether one or more risk control keywords are contained in the text data, the one or more risk control keywords set according to a predetermined regulation or service requirement;

in response to determining that the one or more risk control keywords are contained in the text data, processing, by the server, the text data by: deleting the one or more risk control keywords from the text data, or replacing the one or more risk control keywords with one or more characters;

converting, by the server, the processed text data to voice data;

transmitting, from the server to an Internet of Things (IoT) device, the voice data for the IoT device to play the voice data and;

transmitting, from the server to the IoT device, first play rule configuration for the IoT device to determine multiple first play rules for playing the voice data, wherein each first play rule includes a time of day to start playback and a play mode for voice data having a corresponding one of the multiple services.

12. The method of claim 11, further comprising:
transmitting, by the server, image data or video data to the IoT device for the IoT device to play the image data or the video data.

13. The method of claim 12, further comprising: transmitting, by the server, second play rule configuration information to the IoT device for the IoT device to determine a second play rule for playing the image data or the video data.

14. The method of claim 13, wherein the second play rule includes a second time of day to start playback and a second play mode.

* * * * *